United States Patent Office 3,476,637
Patented Nov. 4, 1969

3,476,637
POLYPHENYLENE OXIDE RESIN BONDED GLASS FIBROUS SHEET AND PROCESS THEREFOR
Anthony V. Nasca and John F. Bacon, Pittsfield, Mass., assignors to General Electric Company, a corporation of New York
No Drawing. Filed July 13, 1965, Ser. No. 471,748
Int. Cl. B32b *17/02*
U.S. Cl. 161—93                                18 Claims

ABSTRACT OF THE DISCLOSURE

Fibrous glass sheet impregnated with high molecular weight polyphenylene oxide reinforcing binder. The impregnated glass sheet is characterized by a capability for post-forming at temperatures in excess of 1400° F.

---

This invention relates to glass fiber sheets having a polyphenylene oxide binder and to a process for their manufacture which includes the step of impregnating a fibrous glass sheet or mat with a solution of a polyphenylene oxide in the presence of a polyphenylene oxide non-solvent.

Resin reinforced laminated materials are well-known, valuable materials for design engineers concerned with products and processes in almost all industries. They offer a desirable combination of mechanical, electrical, and chemical properties, are light in weight, have a favorable strength to weight ratio, and are readily fabricated into various shapes during manufacture.

Base materials used in the manufacture of laminates include many grades of paper, cotton fabrics and mats, canvas, nylon fabric, or other synthetic fibers, woven or matted fibrous glass, woven or felted asbestos, and many other special materials.

Fibrous glass materials, both fabric and mat, have become extremely valuable in laminates requiring superior electrical properties. They are also important in applications requiring low moisture absorption, high tensile strength, flexural strength, compression strength, and high resistance to chemical attack.

Heretofore, resins used in the manfacture of said fabrics and laminates to bind the base materials fell into approximately four general groups. These included the phenolics, melamines, silicones, and epoxies. Various prior art resinous compositions used in the manufacture of laminates are illustrated in U.S. Patents 2,939,856 of Steckler et al., 2,964,491 of Rylander et al., 2,965,586 of Fisch et al., and 2,982,672 of Santelli.

The first step in the conventional process for the manufacture of laminates comprises passing a glass fiber sheet or mat through a solution comprising one of the above-noted resins, a curing agent and a solvent. The fibrous material is saturated with solution and passed through an oven wherein the solvent is removed to form a coherent, reinforced sheet or mat. The reinforced material is then cut, stacked and formed into sheets, tubes, rods or moldings. During this forming operation, heat is applied to the laminate to cure the reinforcing resin. The curing step is essential in order to provide a laminate having rigidity, dimensional stability, and good bond strength. However, as a result of this curing operation, the laminate may not be subjected to subsequent working at elevated temperatures. The ability to post-form a laminate after it has been shaped or molded would be a highly desirable characteristic as it would then be possible to take a laminate having a particular configuration and shape it to conform to a surface within very close tolerances by simply heating. It has now been unexpectedly found that glass fiber sheets and laminates reinforced with a polyphenylene oxide have the rigidity, dimensional stability and good bond strength of many of the prior art compositions and in addition, are susceptible to post-forming at temperatures in excess of 400° F.

It has also been found that though the glass sheets and laminates of this invention may be bonded by impregnation with a solution of polyphenylene oxide in accordance with procedures set forth in the prior art, much higher concentrations of polyphenylene oxide to glass can be obtained when impregnation is carried out in the presence of a non-solvent for the polyphenylene oxide. Increasing the concentration of the polyphenylene oxide in the glass sheets and laminates in this manner results in a product having improved physical properties.

Accordingly, one object of this invention is to provide fibrous glass sheets having a polyphenylene oxide binder and a method for its manufacture.

Other objects and advantages of this invention will be in part apparent and in part pointed out in the description which follows.

Briefly stated, the objects and advantages of this invention are accomplished by impregnating a fibrous glass cloth or mat with a solution of a polyphenylene oxide. In a preferred embodiment, the solution also contains between 1 and 25 percent, by weight, of an additional liquid which is a non-solvent for polyphenylene oxide. After the glass fabric or mat is thoroughly saturated with solution, it is dried by subjecting it to elevated temperatures. If a laminate is desired, the plastic-reinforced sheet is then cut to appropriate size and stacked in layers. The layers are then placed in a press and subjected to heat and pressure to form the laminate. Alternatively, the laminate can be formed prior to drying by pressing the wet layers in a press and subjecting the resulting laminate to drying.

The expression "polyphenylene oxide" as used throughout this application refers to a new body of plastics disclosed and claimed in copending U.S. Patents Nos. 3,306,875 and 3,306,874 of Allan S. Hay, filed concurrently on July 24, 1962, the contents of which are incorporated herein by reference. In a preferred embodiment, the polyphenylene oxides may be represented by the following general formula:

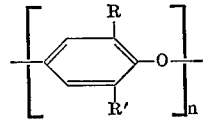

wherein the oxygen atom of one repeating unit is connected to the phenylene nucleus of the next repeating unit. R is a monovalent substituent selected from the group consisting of hydrogen, hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and phenol nucleus; R' is the same as R and in addition halogen; and $n$ is a whole integer greater than 100.

Typical examples of the monovalent hydrocarbon radicals that R and R' may be in the above formula are: alkyl, including cycloalkyl, e.g., methyl, ethyl, propyl, butyl, secondary butyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-bromoallyl, 2- and 3-fluoropropargyl, mono-, di-, tri, tetra-, and pentachlorophenyl, mono-, di-, tri-, and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, butoxy, secondary butoxy, amoxy, hexoxy, octoxy, decoxy, vinoxy, alloxy, butenoxy, propargoxy, phenyloxy toloxy, ethylphenoxy, naphthoxy, methylnaphthoxy, benzoxy, phenylethoxy, phenylpropoxy, tolylethoxy, etc. The monovalent halohydrocarbonoxy radicals may be the same as the above oxyhydrocarbonoxy, except methoxy and α-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono-, di-, tri-, and tetrabromotoloxy, chloroethylphenoxy, ethyl chlorophenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in the process of this invention are:

poly-(2,6-dimethyl-1,4-phenylene)-oxide,
poly-(2,6-diethyl-1,4-phenylene)-oxide,
poly-(2,6-dibutyl-1,4-phenylene)-oxide,
poly-(2,6-dilauryl-1,4-phenylene)-oxide,
poly-(2,6-dipropyl-1,4-phenylene)-oxide,
poly-(2,6-dimethoxy-1,4-phenylene)-oxide,
poly-(2,6-diethoxy-1,4-phenylene)-oxide,
poly-(2-methoxy-6-ethoxy-1,4-phenylene)-oxide,
poly-[2,6-di-(chlorophenoxy)-1,4-phenylene]-oxide,
poly-[2,6-di-(chloroethyl)1,4-phenylene]-oxide,
poly-(2-methyl-6-isobutyl-1,4-phenylene)-oxide,
poly-(2,6-ditolyl-1,4-phenylene)-oxide,
poly-[2,6-di-(chloropropyl)-1,4-phenylene]-oxide, etc.

The term "polyphenylene oxide" as used throughout this application is intended to mean both the substituted and unsubstituted polyphenylene oxides.

The resin-bonded glass sheets and laminates of this invention are prepared by, first, impregnating a glass fabric or mat with a polyphenylene oxide. This can be accomplished by immersing a fibrous glass fabric or mat in a solution containing the polyphenylene oxide. The concentration of polyphenylene oxide in solution should range between 10 to 50 percent, by weight, of the entire composition. Suitable solvents for polyphenylene oxide include, but are not limited to, chloroform, acetone, benzene, toluene, xylene, dichloroethylene, trichloroethylene, nitrobenzene, and thiopene. In general, any organic liquid capable of dissolving polyphenylene oxide and non-reactive with the fibrous glass material may be used.

In order to increase the quantity of polyphenylene oxide contained in the glass fabric, a non-solvent for the polyphenylene oxide is included in the solution. Typical non-solvents for polyphenylene oxide include, but are not limited to, lower molecular weight alcohols, i.e., methyl alcohol, ethyl alcohol, propyl alcohol, isopropyl alcohol, etc.; lower molecular weight organic acids, i.e., acetic acid, propionic acid, etc.; heptane; acetone; hexane; etc. In general, any organic liquid in which the polyphenylene oxide is not soluble and which is non-reactive with the glass fabric or mat may be employed. The quantity of non-solvent contained in solution should be the maximum amount that may be added without causing the polyphenylene oxide to precipitate out. In general, the quantity may vary from between 1 and 25 percent, by weight, of the entire composition, but this is, of course, dependent upon the particular polyphenylene oxide and solvent employed. It appears as if the concentration of polyphenylene oxide deposited on the glass fabric is proportional to the concentration of non-solvent. That is, when the concentration of non-solvent is increased, the quantity of polyphenylene oxide deposited on the glass fabric or mat is increased. Of course, this is also dependent upon the concentration of the polyphenylene oxide in solution. In general, best results have been obtained when the polyphenylene oxide constitutes between 17 to 23 percent, by weight, of the total solution, the solvent constitutes from about 65 to 83 percent, by weight, of the total solution, and the non-solvent constitutes from about 2 to 10 percent, by weight, of the total solution. This composition represents a preferred embodiment of this invention.

After the glass fabric or mat has been saturated with solution, it may be pressed to remove excess liquid and dried in an air circulating oven maintained at an elevated temperature. Drying temperatures may range between 80 and 150° C. and the drying time is that time sufficient to evaporate all of the liquid from the resin-bonded glass sheet. In general, drying times of 1 hour are usually sufficient.

The resin-bonded glass sheets should contain at least 10 percent polyphenylene oxide by weight of the total composition and preferably should contain from 15 to 35 percent, by weight, of the total composition. When the polyphenylene oxide content is less than 10 percent, the sheet does not possess sufficient structural integrity.

Laminates may be formed from resin-bonded glass sheets by stacking a number of sheets to form an assembly and subjecting the assembly to both heat and pressure. The laminate may be pressed at pressures ranging from 500 to 2000 pounds per square inch at temperatures ranging between 300 and 600° F. The laminate should be subjected to this temperature and pressure for a period of time ranging between 15 seconds and 1 hour.

Any number of resin-bonded sheets may be stacked to produce a laminate and the final number is dependent upon the use for which the laminate is intended. For example, if the laminate is to be used as heat insulation, a thick sheet is recommended and as many as 20 bonded sheets may be stacked to form the laminate. However, if the laminate is to be used for electrical insulation, a thin laminate would probably be desired and as few as 2 or 3 stacked sheets will suffice. Of course, the resin-bonded sheet may also be used alone and the laminating step will not be necessary.

The final form of the laminate need not be a flat sheet, but may conform to any configuration desired. Thus, if the laminate is to be used as a heat insulation, the laminate may be molded to a shape approximating the surface to be insulated and then, when used, heated and shaped so as to conform to the exact configuration of the surface to be insulated within very close tolerances.

The resin-bonded glass sheets and laminates of this invention have outstanding physical properties even at elevated temperatures. These properties are equivalent to those possessed by the prior art resin-bonded laminates and yet, the laminates of this invention have a unique advantage in that they may be post-formed to conform to a particular configuration by simply heating the laminate to a temperature in excess of 400° F. Due to the ability of the laminates of this invention to be post-formed at elevated temperatures, they may be shipped as flat sheets to save shipping charges, or, if molded during fabrication, may be fitted to the exact shape desired by subsequent plastic deformation.

The flexural and tensile strengths of the bonded glass fabrics of this invention compare quite favorably with conventional laminates having thermosetting binders as is readily apparent from the following table:

TABLE I.—TENSILE AND FLEXURAL STRENGTHS[1] OF GLASS LAMINATES

| Binder | Tensile Strength (p.s.i.) | Flexural Yield Strength (p.s.i.) |
|---|---|---|
| Polyphenylene oxide | 10,000–36,000 | 16,000–25,000 |
| Polyester | 10,000–20,000 | 15,000–35,000 |
| Teflon | 12,000–20,000 | 11,000–17,000 |
| Silicone | 10,000–35,000 | 10,000–38,000 |
| Epoxy | 11,000–27,000 | 13,000–32,000 |

[1] Comparative data obtained from Modern Plastics Encyclopedia For 1964, Vol. 41/No. 1A, Sept. 1965, pp. 22 and 23, and laboratory data using 2,6-(dimethyl-1,4-phenylene)-oxide as the polyphenylene oxide.

The following examples are illustrative of the process of my invention as well as the properties of the sheets and laminates formed. All percentages expressed in the examples are by weight.

Example 1

In this example, a poly-(2,6-dimethyl-1,4-phenylene)-oxide having an intrinsic viscosity of 0.40 dl./g. as measured in chloroform at 30° C. was used. A 17 percent solution of polyphenylene oxide in chloroform was formed by dissolving an appropriate amount of the polymer in chloroform. This solution was divided into 4 equal parts. Thereafter, isopropyl alcohol was added to each of the 4 solutions. The isopropyl alcohol constituted 2.4 percent of the first solution, 4.8 percent of the second solution, 7.2 percent of the third solution, and 9.7 percent of the fourth solution. A glass cloth identified as Style 128 Volan A finish was immersed in each of the 4 solutions. When saturated with solution, the cloths were removed and air dried for a period of 20 minutes and then oven dried at a temperature of 120° C. for 1 hour. The sheet formed in the solution containing 2.4 percent isopropyl alcohol had a resin content of 15.0 percent. That prepared from the solution containing 4.8 percent isopropyl alcohol had a resin content of 16.6 percent. The glass cloth prepared from the solution containing 7.2 percent isopropyl alcohol had a resin content of 17.7 percent and the glass cloth formed from the solution containing 9.7 percent isopropyl alcohol had a resin content of 18.2 percent.

Example 2

The procedure of Example 1 was repeated but the polyphenylene oxide content was increased to 23 percent. The isopropyl alcohol concentration of each of the four solutions was 2.2 percent, 4.3 percent, 6.5 percent, and 8.6 percent, respectively. The concentration of the resin on the glass fabric after immersion and drying in air for 20 minutes at a temperature of 120° C. for 1 hour was 30.6 percent, 32.6 percent, 37.1 percent, and 35.6 percent, respectively.

Example 3

In this example, 3 laminates were prepared from the resin-bonded sheets of Examples 1 and 2. The first laminate, identified as Sample A, was formed from the resin-bonded glass fabric of Example 1 containing 17.7 percent polyphenylene oxide. Six layers of this material were stacked and pressed at 550 p.s.i. for 30 seconds at a temperature of 550° F. The laminate was 112 mils thick. Sample B was formed from the resin-bonded glass cloth of Example 2 containing 30.6 percent resin. This sample contained 16 layers and was pressed at 1000 p.s.i. for 30 seconds at a temperature of 550° F. The thickness of this laminate was 122 mils. Sample C was formed from the resin-bonded glass cloth of Example 2 containing 35.6 percent resin. Six layers were stacked and pressed at a temperature of 550° F. and a pressure of 550 p.s.i. for a time of 30 seconds. The laminate had a thickness of 46 mils. Various physical properties of these 3 samples were measured and the following results obtained:

TABLE II.—PHYSICAL PROPERTIES OF POLY-(2,6-DIMETHYL-1,4-PHENYLENE)-OXIDE BONDED LAMINATES

| Properties | Sample A | Sample B | Sample C |
|---|---|---|---|
| Tensile yield (p.s.i.) | 22,000 | ([1]) | 36,000 |
| Impact (ft.,lb./Inch Notch) | 14.6 | 14.1 | ([1]) |
| Water absorption (percent by weight) | 2.5 | ([1]) | 0.5 |
| Flexural yield (p.s.i.) | 16,500 | 18,650 | ([1]) |
| Flexural modulus (p.s.i.) | 1,387,000 | 1,190,000 | ([1]) |

[1] Not measured.

From the above data, it can be seen that the laminates of this invention have high tensile yields, flexural yields and flexural moduli. In addition, these laminates are characterized by excellent dimensional stability.

Example 4

In this example, the unbonded glass cloth used in Example 1 was dipped into a solution containing 23 percent poly-(2,6-dimethyl-1,4-phenylene)-oxide, 1 percent isopropyl alcohol, and 76 percent chloroform. After dipping, the glass cloth was subjected to pressure to remove the excess liquids and dried in an air circulating oven maintained at 110° C. for 1 hour. The dried sheet was then cut into strips and stacked to form a 6 ply glass laminate. This laminate was pressed at 550° C. for 3 minutes at a pressure of 500 pounds per square inch. The finished laminate was translucent and had a tensile strength of 36,400 p.s.i..

Example 5

In this example, a laminate was prepared by stacking 12 layers of a glass fabric with alternating layers of a film of poly-(2,6-dimethyl-1,4-phenylene)-oxide. The assembly was then pressed at a pressure of 500 pounds per square inch and a temperature of 550° F. for 3½ minutes. The resulting laminate was clear and had a flexual modulus of 1,387,000 p.s.i., of flexural yield of 16,500 p.s.i., an Izoid impact strength of 14.6 ft./lb./inch notch and water adsorption of 2.6 percent after immersion for 24 hours at room temperature.

It should, of course, be apparent to those skilled in the art that changes may be made in the particular embodiments of the invention described which are within the full intent and scope of the invention as defined by the appended claims. For example, the laminate may be formed by mixing a powdered polyphenylene oxide with the glass cloth or mat followed by pressing. Laminates formed by this process would have the unique advantage of moldability after fabrication at elevated temperatures but would probably lack the physical properties of the laminates produced in a manner in accordance with this invention.

What we claim as new and desire to secure by Letters Patent of the United States is:

1. A polyphenylene oxide resin-bonded glass fibrous sheet having a softening point at a temperature in excess of 400° F. consisting of a fibrous glass base material impregnated and reinforced with a polyphenylene oxide resin, said polyphenylene oxide conforming to the structural formula:

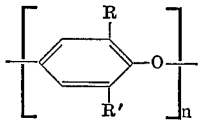

wherein the oxygen atom of one repeating unit is connected to the phenylene nucleus of the next repeating unit; R is a monovalent substituent selected from the group consisting of hydrogen, hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and the phenol nucleus; R' is the same as R and in addition halogen; and $n$ is a whole integer greater than 100.

2. The resin-bonded fibrous glass sheet of claim 1 wherein the polyphenylene oxide is a poly-(2,6-dimethyl-1,4-phenylene)-oxide.

3. The resin-bonded fibrous glass sheet of claim 1 wherein the polyphenylene oxide is a poly-(2,6-diphenyl-1,4-phenylene)-oxide.

4. The resin-bonded fibrous glass sheet of claim 1 wherein the polyphenylene oxide comprises at least 10 percent, by weight, of the entire composition.

5. The resin-bonded fibrous glass sheet of claim 1 wherein the polyphenylene oxide comprises from 15 to 35 percent, by weight, of the entire composition.

6. A laminated assembly formed from a plurality of resin-bonded glass fibrous sheets of claim 1.

7. The laminated assembly of claim 6 wherein the assembly contains more than two layers of resin bonded glass fibrous sheets.

8. A method for forming a polyphenylene oxide resin-reinforced glass fibrous sheet having a softening point at a temperature in excess of 400° F. which comprises the steps of:

(a) preparing a solution containing a solvent, a polyphenylene oxide resin and a polyphenylene oxide non-solvent, said polyphenylene oxide conforming to the structural formula:

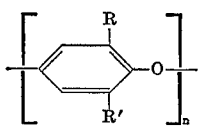

wherein the oxygen atom of one repeating unit is connected to the phenylene nucleus of the next repeating unit; R is a monovalent substituent selected from the group consisting of hydrogen, hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and phenol nucleus, hydrocarbonoxy radicals, and halohydrocarbonoxy radicals having at least two carbon atoms between the halogen atom and the phenol nucleus; R' is the same as R and in addition halogen; and $n$ is a whole integer greater than 100, (b) immersing a fibrous glass material selected from the group consisting of glass fabrics and glass mats in the solution, (c) removing said fibrous glass material from said solution and (d) drying said fibrous glass material to obtain a polyphenylene oxide bonded glass sheet.

9. The process of claim 8 wherein the polyphenylene oxide is poly-(2,6-dimethyl-1,4-phenylene)-oxide.

10. The process of claim 8 wherein the polyphenylene oxide non-solvent is isopropyl alcohol.

11. The process of claim 8 wherein the solution consists of from 65 to 83 percent, by weight, chloroform, 17–23 percent, by weight, polyphenylene oxide and 2–10 percent, by weight, isopropyl alcohol.

12. A process for forming a laminated assembly from fibrous glass base materials having a softening point at a temperature in excess of 400° F. which comprises the steps of:

(a) forming a solution containing a solvent, a polyphenylene oxide resin and a polyphenylene oxide non-solvent, said polyphenylene oxide conforming to the structural formula:

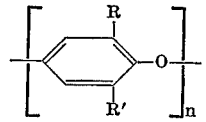

wherein the oxygen atom of one repeating unit is connected to the phenylene nucleus of the next repeating unit, R is a monovalent substituent selected from the group consisting of hydrogen, hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and the phenol nucleus; R' is the same as R and in addition halogen; and $n$ is a whole integer greater than 100;

(b) immersing a fibrous glass material selected from the group consisting of glass fabrics and glass mats in said solution;

(c) removing said fibrous glass material from said solution;

(d) drying said fibrous glass material to obtain a polyphenylene oxide reinforced glass fibrous sheet;

(e) stacking a plurality of said polyhenylene oxide bonded glass sheets to form an assembly and (f) subjecting said assembly to heat and pressure to form an integral laminate.

13. The process of claim 12 wherein the polyphenylene oxide is a poly-(2,6-dimethyl-1,4-phenylene)-oxide.

14. The process of claim 12 wherein the polyphenylene oxide is poly-(2,6-diphenyl-1,4-phenylene)-oxide.

15. The process of claim 12 wherein the solution consists of from 65 to 83 percent, by weight, chloroform; 17 to 23 percent, by weight, polyphenylene oxide; and 2 to 10 percent, by weight, isopropyl alcohol.

16. The process of claim 12 wherein the stacked assembly is subjected to a temperature of from 300 to 600° F. and to a pressure of from 500 to 2000 pounds per square inch.

17. The process of claim 12 wherein the stacked assembly is subjected to a temperature of 550° F. and to a pressure of 1000 pounds per square inch.

18. The process of claim 12 wherein the assembly contains more than two layers of said reinforced fibrous glass sheets.

References Cited

UNITED STATES PATENTS

| | | |
|---|---|---|
| 3,277,048 | 10/1966 | Sonnabend _____ 161—185 |
| 3,306,874 | 2/1967 | Hay. |
| 3,306,875 | 2/1967 | Hay. |
| 3,323,962 | 6/1967 | Sprengling et al. ____ 161—185 |

ROBERT F. BURNETT, Primary Examiner

WILLIAM J. VAN BALEN, Assistant Examiner

U.S. Cl. X.R.

117—126; 156—327; 161—192; 260—47